(No Model.)

H. F. ENGELS.
RACING SULKY.

No. 563,364. Patented July 7, 1896.

WITNESSES.
Matthew M. Blunt
Samuel P. Thrasher

INVENTOR.
Hugo F. Engels
by A. H. Gieseer,
ATT'Y.

United States Patent Office.

HUGO F. ENGELS, OF BOSTON, MASSACHUSETTS, ASSIGNOR OF ONE-HALF TO FREDERICK C. THWAITS, OF CAMBRIDGE, MASSACHUSETTS.

RACING-SULKY.

SPECIFICATION forming part of Letters Patent No. 563,364, dated July 7, 1896.

Application filed April 22, 1895. Serial No. 546,634. (No model.)

*To all whom it may concern:*

Be it known that I, HUGO F. ENGELS, a citizen of the United States, residing at Boston, in the county of Suffolk and Commonwealth of Massachusetts, have invented a new and useful Sulky-Frame, intended to be commonly used with sulkies having low wheels of from twenty-four to twenty-eight inches diameter, of which the following is a specification.

The peculiarity of my invention is the obliquely-arranged arched or horseshoe-shaped frame, extending rearwardly from the wheel-axles at an angle of about forty-five degrees, furnished at its upward bend with a seat for the driver, and provided with shafts projecting forward therefrom and having brace-rods running to the axles of the wheels or termini of the frame. The frame proper is U-shaped, preferably tubular, and may be made of two nearly parallel and connected metallic arches, springing from the axle at opposite sides of the wheel, or, as shown, of a single arch with bearings for the short axle each side of the wheel.

Figure 1:
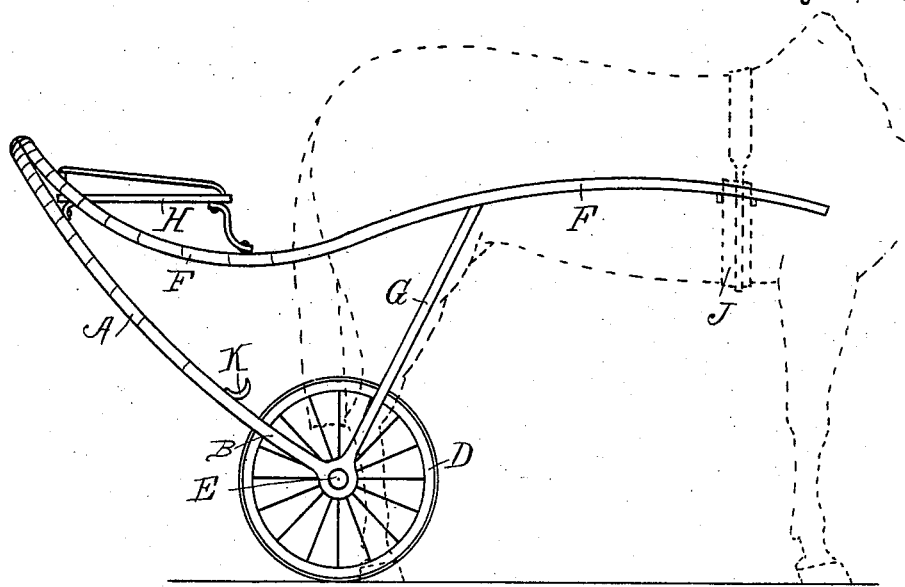
Figure 2:
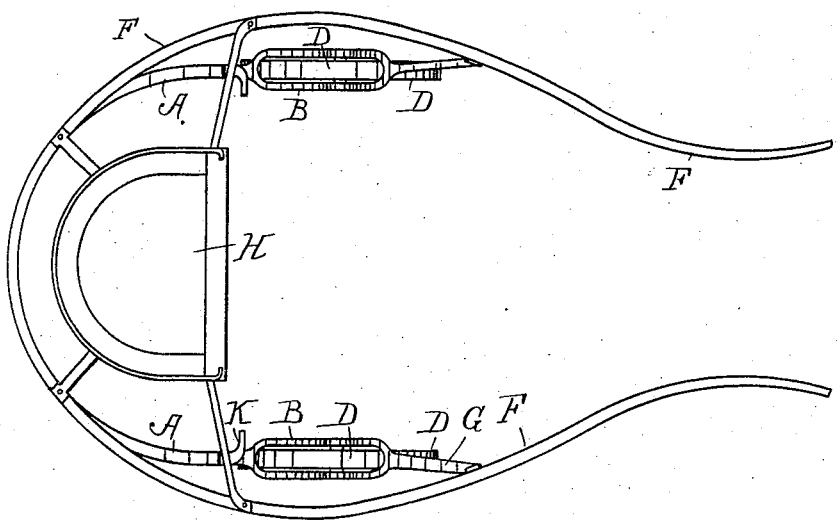

In the drawings, Figure 1 is a side view of my improved sulky, showing the position of the frame and seat with relation to the horse. Fig. 2 is a top plan of the vehicle.

A represents the U-shaped frame, which may be in the form of a single arched tube A with forks B at each lower end, or of two bars, connected at intervals by suitable cross-pieces.

D D are the wheels, and E E their axles, to the outer and inner ends of which the forks of the frame-arches are connected. The shafts F are secured at their rearward bend to the upper portion of the frame-arch A, and brace-rods G extend from each shaft to the axle E or the frame-fork B.

The seat H is mounted on the frame A at its upper bend and upon the shafts F at their rear portion; and as this frame extends obliquely rearward its weight and that of the driver, instead of bearing down upon the horse, tends to lift the animal by counterbalancing a portion of his weight, thereby making him very light-footed. The arch A, the shafts F, and brace-rods G make up, as seen in side elevation, an approximately triangular framing, supported at the lower angle, where the axles E constitute a fulcrum. The weight of the driver in his seat H is thus applied to the short arm of a lever and exerts a certain lifting power beneath the horse by the belly-band J, to which the shafts are suitably secured by means of convenient fastenings. Foot-rests K for the driver's feet are located on the frame A, the fork B, or the braces G. The driver may shift his position somewhat from rear to front of the seat, and thus vary the lifting power he exerts. With my sulky a heavy jockey is no serious handicap.

The whole structure will be of the lightest possible character consistent with strength. The wheels are small and light and work within the forks B or between the lower ends of parallel frame-bars if such construction is preferred.

I am aware that sulkies have been before proposed in which arched shafts and an arched bracing-frame have been provided, and I do not claim this as my invention, but so far as I am aware it is new to provide a racing-sulky to support the driver immediately at the rear of the horse and behind the wheel-axles with the space in front of the driver's seat, thus located at the rear of the wheel-axles, entirely uninterrupted, whereby the weight of the sulky is approximately balanced on the wheels and the weight of the driver is also largely taken off from the horse and supported on the wheels. There has been a sulky with an arched rear portion, somewhat resembling my frame part A, and provided with a seat forward of the axles and raised over the horse, so that the weight of the driver would be carried almost entirely by the horse, and also a sulky in which the driver's seat was located directly over the axle with the horse entirely in front of the axle. By my construction, however, as above described, the horse is given room for perfectly free movement between the shafts, and yet the sulky is moved ahead in relation to the horse in the most compact arrangement, with the wheels at either flank of the horse, while the driver is carried comparatively low down and mainly supported on the axles, with his seat centrally located between and directly on the shaft or shafts. Besides these main features of novelty and advantage, other improvements in details, as above shown and described, will be pointed out in the claims.

I claim as my invention—

1. A racing-sulky, comprising a rearwardly and upwardly arched frame, an axle and wheel carried thereby at either end, shafts arched together at their rear portions, lying above and in approximately the same vertical plane with said frame, said shafts at their rear arched portion being rigidly connected to the upper portion of said frame, braces connecting said frame at its lower axle portions to said shafts intermediate their length, and a driver's seat centrally located between said shafts within the rear arched portion thereof and at the rear of said axles, with an uninterrupted free space, for the horse, extending forward from said seat, substantially as described.

2. A racing-sulky, comprising a rearwardly and upwardly arched metallic tubular frame, an axle and wheel carried thereby at either end, each frame end being arranged to support its axle at either end thereof, shafts arched together at their rear portions, lying above and in approximately the same vertical plane with said frame, said shafts at their rear arched portion being rigidly connected to the upper portion of said frame, braces connecting said frame at its lower axle portions to said shafts intermediate their length, and a driver's seat centrally located between said shafts within the rear arched portion thereof and at the rear of said axles, with an uninterrupted free space, for the horse, extending forward from said seat, substantially as described.

In testimony whereof I have signed my name to this specification, in the presence of two subscribing witnesses, on this 20th day of April, A. D. 1895.

HUGO F. ENGELS.

Witnesses:
A. H. SPENCER,
F. C. THWAITS.